(12) United States Patent
Kraiss et al.

(10) Patent No.: US 7,370,316 B2
(45) Date of Patent: *May 6, 2008

(54) MINING MODEL VERSIONING

(75) Inventors: Achim Kraiss, Lautertal (DE); Jens Weidner, Leimen (DE)

(73) Assignee: SAP AG, Walldorf (DE)

( * ) Notice: Subject to any disclaimer, the term of this patent is extended or adjusted under 35 U.S.C. 154(b) by 689 days.

This patent is subject to a terminal disclaimer.

(21) Appl. No.: 10/633,884

(22) Filed: Aug. 4, 2003

(65) Prior Publication Data

US 2004/0249867 A1    Dec. 9, 2004

Related U.S. Application Data

(63) Continuation-in-part of application No. 10/454,370, filed on Jun. 3, 2003.

(51) Int. Cl.
    *G06F 9/44*    (2006.01)
(52) U.S. Cl. .................. 717/100; 707/101; 707/5; 707/2; 706/55
(58) Field of Classification Search .............. None
    See application file for complete search history.

(56) References Cited

U.S. PATENT DOCUMENTS

| | | | |
|---|---|---|---|
| 5,317,722 A | | 5/1994 | Evans |
| 5,603,027 A | | 2/1997 | Ohkami |
| 5,974,428 A | | 10/1999 | Gerard et al. |
| 6,216,137 B1 | | 4/2001 | Nguyen et al. |
| 6,240,411 B1 | * | 5/2001 | Thearling ............. 707/5 |
| 6,460,037 B1 | | 10/2002 | Weiss |
| 6,470,333 B1 | | 10/2002 | Baclawski |
| 6,778,971 B1 | * | 8/2004 | Altschuler et al. ......... 706/55 |
| 6,782,390 B2 | * | 8/2004 | Lee et al. ................. 707/101 |
| 6,820,073 B1 | | 11/2004 | Bedell |
| 6,842,751 B1 | * | 1/2005 | Vilalta et al. ............. 707/6 |
| 6,920,458 B1 | * | 7/2005 | Chu et al. ................ 707/102 |
| 6,941,301 B2 | * | 9/2005 | Ferguson et al. ......... 707/4 |

(Continued)

FOREIGN PATENT DOCUMENTS

WO    03/005232    1/2003

(Continued)

OTHER PUBLICATIONS

U.S. Appl. No. 10/454,370, filed Jun. 3, 2003, Kraiss et al.

(Continued)

*Primary Examiner*—Wei Zhen
*Assistant Examiner*—Phillip H Nguyen
(74) *Attorney, Agent, or Firm*—Fish & Richardson P.C.

(57) ABSTRACT

One implementation provides a computer system that allows front-end software applications to use multiple versions of a data mining model during execution of analytical tasks. In this implementation, the computer system includes a model version selection module that is operable to use a task name in a task request received from a front-end software application to determine a specific version of a data mining model to be used during execution of an analytical task. The computer system also includes a mapping module that is operable to map input data included in the task request received from the front-end software application into a format usable by the specific version of the data mining model.

15 Claims, 12 Drawing Sheets

U.S. PATENT DOCUMENTS

| | | | |
|---|---|---|---|
| 6,941,318 B1* | 9/2005 | Tamayo et al. | 707/102 |
| 6,954,758 B1 | 10/2005 | O'Flaherty | |
| 7,024,417 B1* | 4/2006 | Russakovsky et al. | 707/101 |
| 7,092,968 B1* | 8/2006 | Ebel et al. | 707/104.1 |
| 2002/0051063 A1 | 5/2002 | Hwang | |
| 2002/0078039 A1 | 6/2002 | Cereghini | |
| 2003/0043815 A1 | 3/2003 | Tinsley | |
| 2003/0220860 A1* | 11/2003 | Heytens et al. | 705/35 |
| 2004/0098358 A1 | 5/2004 | Roediger | |

FOREIGN PATENT DOCUMENTS

WO     WO 03/037018     5/2003

OTHER PUBLICATIONS

U.S. Appl. No. 10/652,872, filed Aug. 29, 2003, Kraiss et al.
U.S. Appl. No. 10/664,771, filed Sep. 17, 2003, Kraiss et al.
U.S. Appl. No. 10/665,249, filed Sep. 18, 2003, Kraiss et al.
http://www.sas.com/news/preleases/111802/news2.html—"SAS Acquires Technology to Track Customer Behavior In Real-Time," printed from the Internet Apr. 18, 2003, 2 ps.
http://www.epiphany.com/news/2002press/2002_08_27.html—E.Piphany—"E.Piphany Real-Time Wins CRM Excellence Award from Customer Inter@ction Solutions Magazine," printed from the Internet Apr. 18, 2003, 2 ps.
http://www.verilytics.com/products/index.html—"Verilytics Products," printed from the Internet Apr. 18, 2003, 2 ps.
http://www.dmg.org/faq.htm—"Frequently Asked Questions," printed from the Internet Apr. 18, 2003, 2 ps.
"Welcome to The Real-Time Enterprise," PeopleSoft, Inc., undated, 8 ps.
"DataDistilleries Real-Time Suite," DataDistilleries, undated, 2 ps.
"DataDistilleries Analytical Suite," DataDistilleries, undated, 2 ps.
PowerPoint Presentation, Analytical CRM, SAP AG, unated, 24 ps.
U.S. Appl. No. 10/454,370 (Final Office Action dated Aug. 10, 2007).
U.S. Appl. No. 10/454,370 (Non-final Office Action dated Nov. 21, 2006).
U.S. Appl. No. 10/652,872 (Non-final Office Action dated Jun. 12, 2007).

* cited by examiner

MINING MODEL VERSIONING

RELATED APPLICATION

This application is a continuation-in-part application that claims priority to application Ser. No. 10/454,370 that was filed on Jun. 3, 2003.

TECHNICAL FIELD

This invention relates to computing systems that utilize data mining models.

BACKGROUND

In a real-time analytics system, various front-end software applications provide customer transaction data directly to an analytical software application that is capable of executing analytical tasks. An example of such an analytical software application is a prediction application that provides useful, predictive output relating to a transaction with a customer. An analytical software application is capable of processing real-time data from a customer to execute analytical tasks and to generate output. In many instances, the analytical software application will use the real-time data in coordination with a data mining model to generate a predictive output. A data mining model is typically derived from historical data that has been collected, synthesized, and formatted. In many instances, a predictive output generated upon execution of an analytical task is fed into a business rule engine. The business rule engine will use the predictive output in conjunction with its rule set to determine if certain events should be triggered in a given front-end application. For example, the business rule engine may determine that a special promotional offer should be provided to a particular customer given the content of the predictive output and the nature of the transaction with that customer. In some instances, the front-end applications may directly process the predictive output.

During operation of the real-time analytics system, new data needs to be considered by the data mining model. For example, a data mining model that is used to predict the customer churn probability must take into account the latest behavior of customers. Therefore, new data must be used to "re-train," or update, an existing data mining model. The updated model then can be used during the execution of subsequent analytical tasks. As multiple front-end software applications may want to use the same model, but with different timeliness of data used to train the models, the applications have to deal with a large set of different mining model "versions." For example, a front-end software application may want to use a first version of a mining model that is trained with customer data from 2002, but may later want to use a second version of the mining model that is trained with customer data from 2003. Typically, however, front-end software applications maintain direct interfaces to the analytical software applications that utilize these models for predictions during task execution. In maintaining these interfaces, the front-end software applications often need to have detailed knowledge of the specific types of analytical software applications and data mining model versions that are used. For instance, a front-end application may need to provide specific input information that is specific to the model version used by the analytical software application when executing analytical tasks. In the example above, the front-end application may need to provide different types of input information depending on whether the first model version (trained with customer data from 2002) or the second model version (trained with customer data from 2003) is used.

SUMMARY

Various implementations of the invention are provided herein. One implementation provides a computer system that allows front-end software applications to use multiple versions of a data mining model during execution of analytical tasks. In this implementation, the computer system includes a model version selection module that is operable to use a task name in a task request received from a front-end software application to determine a specific version of a data mining model to be used during execution of an analytical task. The computer system also includes a mapping module that is operable to map input data included in the task request received from the front-end software application into a format usable by the specific version of the data mining model.

Certain implementations of the present invention may have many advantages. For example, front-end applications are able to easily and quickly switch between model versions that are to be utilized when executing analytical tasks. In certain scenarios, these front-end applications need only to provide a task name and one or more input values used for execution of the task. In these scenarios, the front-end applications do not need to specify the version of the model to be used, and also do not need to specify a mapping for input and output parameters between the application and the model version to be used. Certain implementations of the invention, however, allow parameter mappings to be customized to a specific model version. In these implementations, a task definition in an Analytical Application Provider (AAP) may specify particular mappings that are to be used for the input or output parameters between the application and a given model version. These mappings, however, are transparent to the application.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
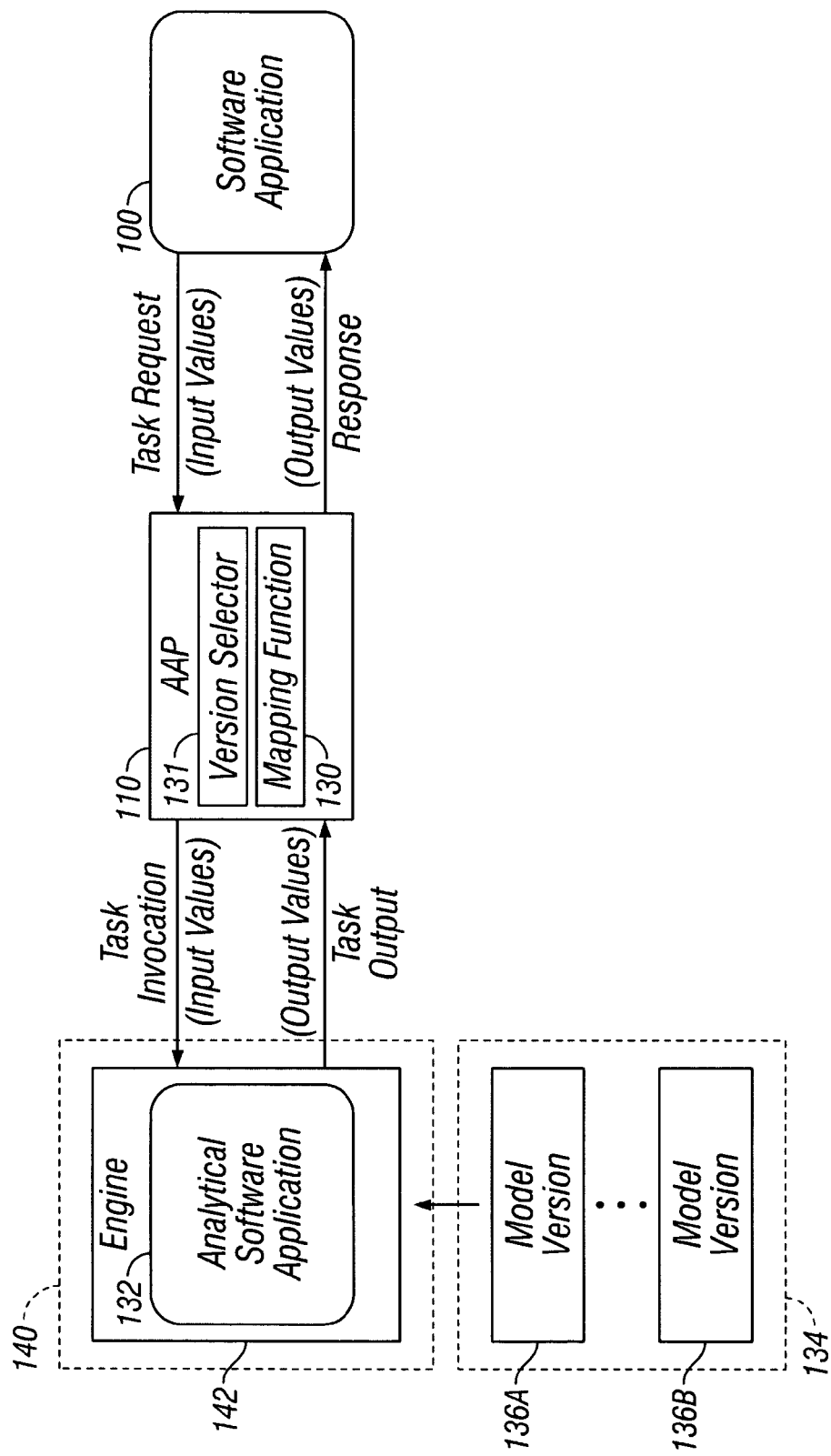
FIG. 1A is a block diagram of a computing system that utilizes multiple versions of a data mining model during execution of analytical tasks.

FIG. 1A is a block diagram of a computing system that utilizes multiple versions of a data mining model during execution of analytical tasks, such as prediction tasks. In the implementation shown in FIG. 1A, a front-end software application 100 initiates requests to execute analytical tasks. The initiation of these requests may result from various events occurring during operation of the front-end software application 100. The software application 100 sends these requests to the Analytical Application Provider (AAP) 110. The requests include one or more input values and a task name. The version selector 131 of the AAP 110 uses the task name to identify a version of a data mining model to be used when executing the task. For example, the version selector 131 may use the task name to reference a definition of a task (such as the task definition shown later in FIG. 7A) to identify that a particular mining model version should be used, such as model version 136A contained within model repository 134. (Model repository 134 may reside in a local database of AAP 110 or in a remote data warehouse (such as the local database 116 and the data warehouse 124 shown in FIG. 1B)). The AAP 110 then uses a mapping function 130 to map the input values provided by the request from the software application 100 into a set of mapped input values, which are routed to the analytical software application 132. The analytical software application 132 operates within an engine 142 (such as a prediction server), which is contained within a set of engines 140. The analytical software application 132 is capable of executing the requested analytical task. To do so, the analytical software application 132 uses the identified model version, such as model version 136A. The analytical software application 132 provides the mapped input values for use by model version 136A during execution of the analytical task. One or more output values are generated upon execution of the analytical task, and are passed by the analytical software application 132 to the AAP 110. The AAP 110 uses the mapping function 130 to map these output values into a set of mapped output values, which are routed back to the front-end software application 100.

During run-time operation, new or updated information may be provided for use with a data mining model during execution of analytical tasks. The new or updated information may include data captured or processed during the execution of various analytical tasks over a period of time. In these scenarios, a new version of the data mining model can be introduced into the run-time environment. For example, within the model repository 134, a new model version 136B can be introduced and used to replace the prior model version 136A. During subsequent execution of analytical tasks, the new model version 136B is used by the analytical software application 132 rather than the prior model version 136A. The software application 100 continues to initiate requests to execute analytical tasks, and passes input values to the AAP 110. The input values passed by the software application 100 have the same data type, regardless of the version of the data mining model that may be used. That is, the software application 100 passes values for the same set of input fields to the AAP 110 whether model version 136A or 136B is used, as shown in the example in FIG. 1A. The software application 100 does not need to change its application interface to accommodate input values of different data types when different model versions are used during execution of the analytical tasks. This allows the software application 100 to have a more stable and generic interface with the AAP 110, and reduces the overhead in maintaining software application 100. In addition, the software application 100 needs only to provide a task name, in one implementation, in order for the version selector 131 to identify the specific model version to be used. The version selector 131 uses the task name provided by the software application 100 to reference a task definition that contains the version information. In this fashion, the software application 100 need not specify the model version that is to be used for task execution.

In certain implementations, the mapping functionality 130 contains translation functionality. In these implementations, the mapping functionality 130 is capable of translating input or output values between the software application 100 and the analytical software application 132. The translation may be required to convert values of a certain domain and data type into a different domain and data type that is recognized by the version of the data mining model being used, such as model version 136A or 136B. For example, the software application 100 may provide a value for input field "IN" (e.g., "male") of data type "string," and may expect a value for output field "OUT" (e.g., "will churn") of data type "string." The analytical software application 132 may expect an input value of "TASK_IN" of data type "integer" (e.g., 0) when using model version 136A during task execution to generate a value for output field "TASK_OUT" (e.g., 1) of data type "integer." In this scenario, the mapping functionality 130 is capable of translating the string value of the input field "IN" into an integer value for the input field "TASK_IN." Similarly, the mapping functionality 130 is also capable of translating the integer value of the output field "TASK_OUT" into a string value for the output field "OUT."

In one implementation, the mapping functionality 130 is specified by the definition of the analytical task in the request sent from the software application 100. In this implementation, a designer may specify the mapping functionality 130 utilized by the AAP 110 when defining the analytical task that is requested by the software application 100. In some implementations, model versions 136A or 136B are represented using the Predictive Modeling Markup Language (PMML).

The software application 100 need not be directly coupled to the engine 142 and the analytical software application 132, and this provides certain advantages. For example, the software application 100 need not specify the precise analytical engine and precise model version that are to be used, but need only specify the task to be executed by the AAP 110. The task definition in the AAP 110 contains the information of the engine and model version to be used for task execution, which could be changed dynamically without impact on the software application 100. This provides independence to the software application 100, leading to reduced maintenance costs. The generic API to the AAP 110 allows the software application 100 simply to provide the task name and input data. In addition, the software application 100 need not provide model version-specific information as input, because the mapping function 130 in the AAP 110 contains the model version-specific mapping functionality. This provides additional independence to the application, as the exchange of specific data values can be completely hidden from the software application 100. In addition, various different engines and model version can be more easily introduced into the system without adding extra interface overhead to the software application 100. The AAP 110, and its version selector 131 and mapping function 130, manage the engine- and model version-specific details.

As shown in FIG. 1A, requests and responses flow directly between the software application 100 and the AAP 110. In many implementations, a business rule engine, such as the business rule engine 108 shown in FIG. 1B, couples the software application 100 with the AAP 110. In these implementations, the business rule engine 108 passes requests sent from the software application 100 directly to the AAP 110. The business rule engine 108 also passes responses from the AAP 110 to the software application 100. In addition, the business rule engine 108 also uses the output information in the responses sent from the AAP 110 to determine if certain events should be signaled to other rules, or if certain actions should be processed in the software application 100. As part of the analytical front-end, the business rule engine 108 provides functionality for the business rules that are to be applied. For example, the business rule engine 108 may apply certain rules that initiate the offering of special discount offers to new or existing customers.

Figure 1B:
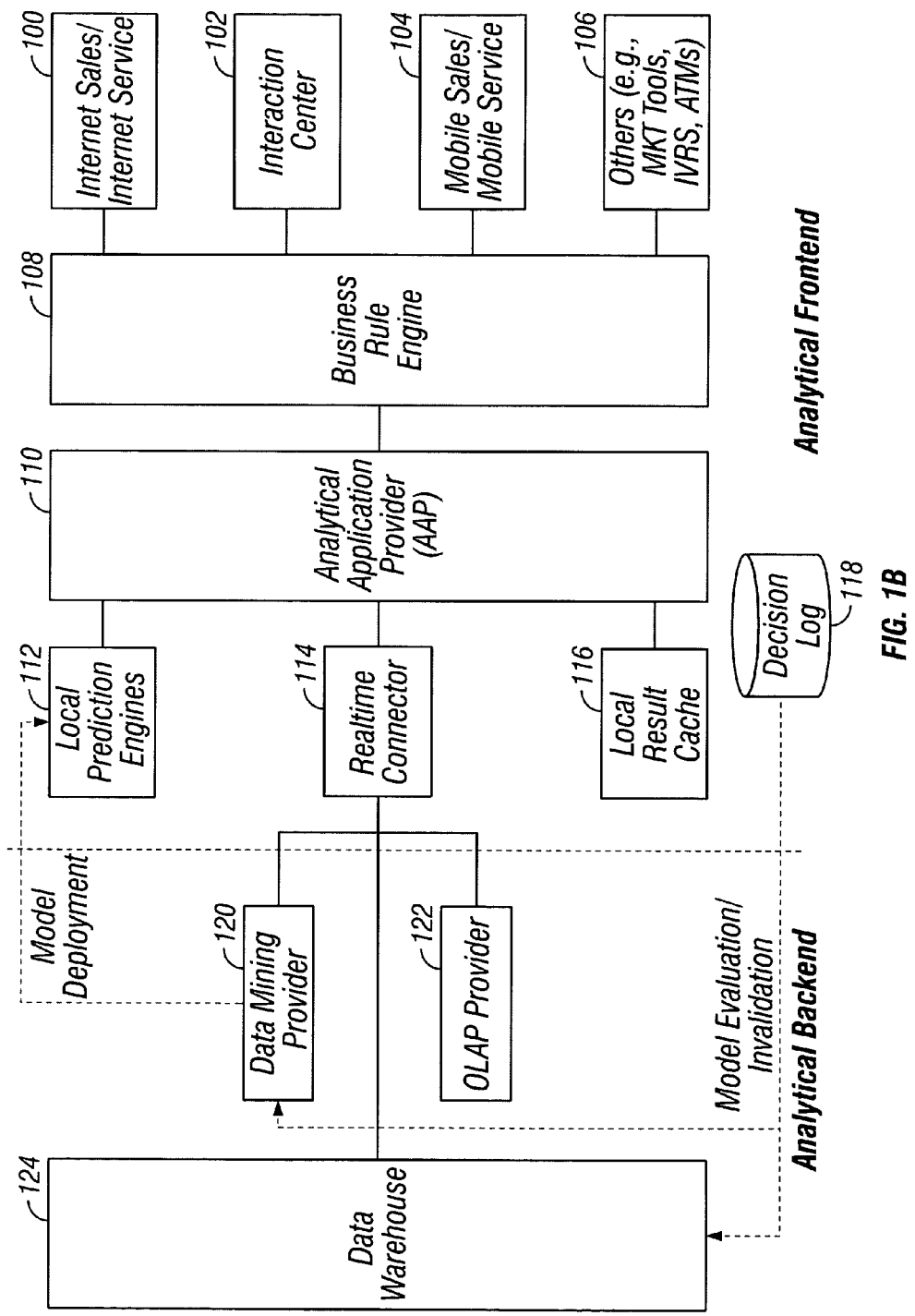
FIG. 1B is a block diagram of a computing system that incorporates the components shown in FIG. 1A.

FIG. 1B is a block diagram of a computing system that incorporates the components shown in FIG. 1A. In this data processing system, Analytical Application Provider (AAP) 110 couples front-end software applications (such as applications 100, 102, 104, or 106) with analytical software applications on analytical engines, such as prediction servers or key performance indicator (KPI) servers, during the execution of analytical tasks. The analytical engines may be local to AAP 110, or may instead be part of an analytical back-end. For example, the local prediction engines 112 are local to AAP 110, while the data mining provider 120 and OLAP (online analytical processing) provider 122 are part of the analytical back-end. Engines 140 shown in FIG. 1A may be contained within local prediction engines 112 is some implementations, and may be contained in data mining provider 120 or OLAP provider 122 in other implementations. Model repository 134 shown in FIG. 1A may be contained within local cache 116 in some implementations, and may be contained within data warehouse 124 in others. After analytical tasks have been executed by the corresponding analytical engines, AAP 110 then routes output information generated from the execution of these tasks back to front-end applications 100, 102, 104, or 106.

Data warehouse 124, data mining provider 120, and OLAP provider 122 serve as part of an analytical back-end that is coupled to AAP 110 via realtime connector 114. This analytical back-end may provide a framework and storage mechanisms for data mining models or other analytical data stores that are stored externally from AAP 110. These components of the analytical back-end are coupled to AAP 110 using real-time connector 114. Local versions of the data mining models or other data stores may be stored in local result cache 116 for faster and easier access by AAP 110. Decision log 118 is used keep track of the predictions, KPI-lookups, and the rule executions during run time of the system. The information stored in decision log 118 may be viewed by an administrator to analyze various execution results. This information may also be used to judge the quality of prediction models and rules, and may also be fed back into data warehouse 124 for sophisticated long-term analyses. Based on these analyses, models may be retrained, or updated, and rules may be re-adjusted and be automatically deployed to AAP 110 without impact to the front-end software applications.

In one scenario, a data mining expert may create and update mining models with data from a customer knowledge base in data warehouse 124. The data within data warehouse 124 could include customer profiles, historical customer orders, etc. OLAP provider 122 provides direct access to KPI information derived from customer profiles, historical customer orders, etc. Data mining provider 120 is used for model deployment, and data mining provider 120 also provides an interface to AAP 110 for executing remote predictions based on mining models located in data warehouse 124. Using real-time connector 114, a mining model can be exported to AAP 110. In one implementation, the model is in a PMML-compliant format. A PMML-compliant format is one that adheres to the syntax of the standardized Predictive Modeling Markup Language (PMML). PMML is used to define the components of a model in a standard form that can be interpreted by other computing systems.

In one implementation, real-time connector 114 can also connect to third-party mining providers, which themselves can export and import models and provide predictions based on their local models. These third-party mining providers can be located on local or remote servers. It is not necessary that the system include data warehouse 124, data mining provider 120, OLAP provider 122, and real-time connector 114. For example, these components are not needed when the data stores used during the execution of analytical tasks are stored in local cache 116 and when local engines, such as local prediction engines 112, are utilized.

Figure 2:
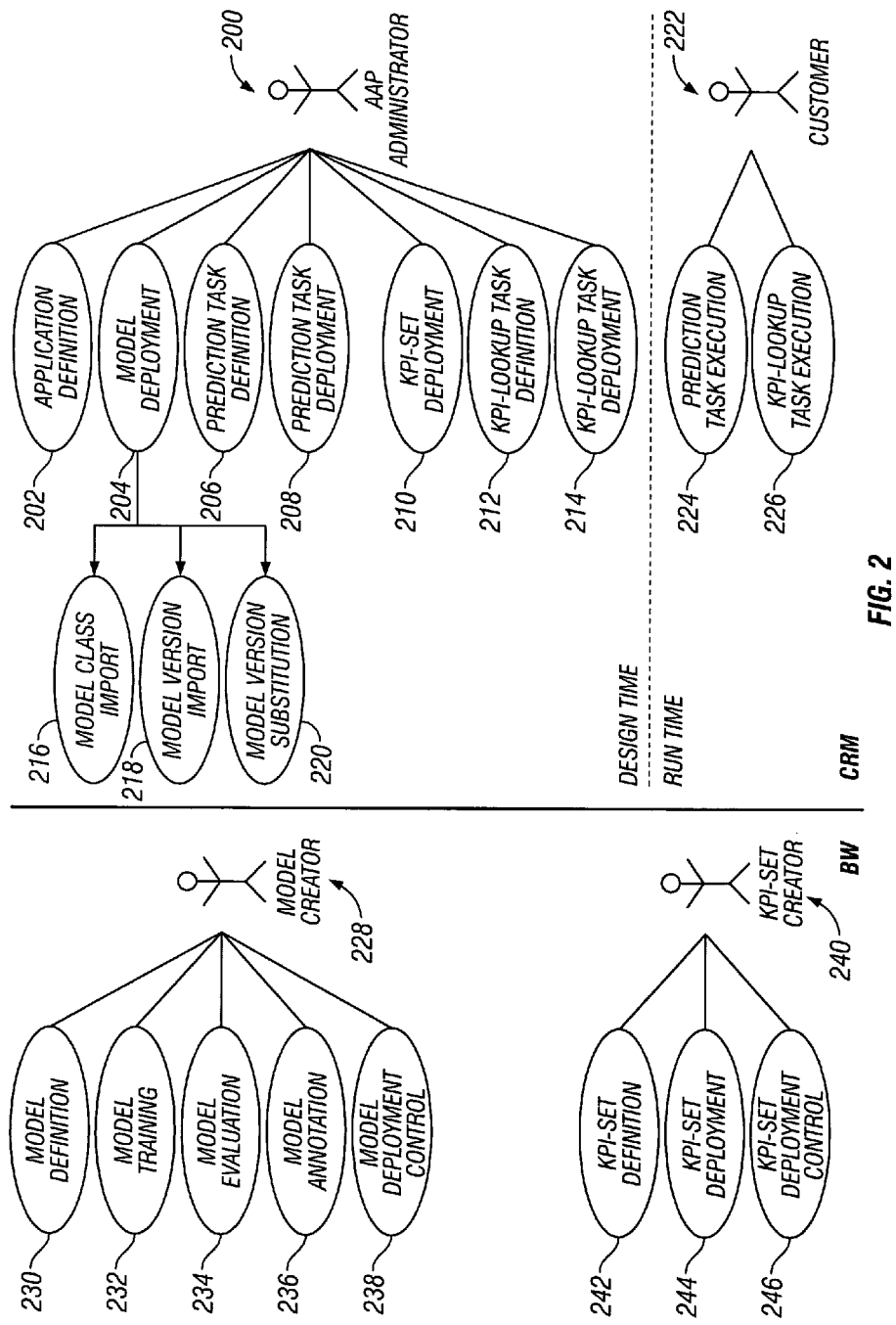
FIG. 2 is a use-case diagram of design- and run-time scenarios for various implementations.

FIG. 2 is a use-case diagram of design- and run-time scenarios for various implementations of the invention. FIG. 2 illustrates various use cases performed by the pictured actors in various design- and run-time scenarios. The use cases shown in FIG. 2 are performed to achieve various analytical functions in a computer system, such as the system shown in FIG. 1B.

FIG. 2 first shows various aspects of mining model creation. Model creator 228 is responsible for model definition 230, model training 232, model evaluation 234, model annotation 236, and model deployment control 238. These use cases typically occur within a data warehouse or a business information warehouse (BW). Model definition 230 includes the logical definition of a mining model that will be used within the system in terms of the information that will flow into the model. Model training 232 includes updating the model over time as it is used. Model evaluation 234 includes testing the quality and effectiveness of the model. Model annotation 236 includes annotating model semantics using textual descriptions to precisely describe the "rules" in the model. The annotations can be related to the entire model, as well as to individual elements of the model such as categories and clusters. Model annotations play an important part in allowing an AAP administrator to understand how a model can be applied for predictions in front-end applications. Model deployment control 238 includes deploying and exporting the model to AAP 110.

KPI-set creator 240 is responsible for KPI-set definition 242, KPI-set deployment 244, and KPI-set deployment control 246. KPI's, or key performance indicators, are key indicators or figures that can be derived from the data collected in a warehouse, such as data warehouse 124. KPI's may include such indicators as customer revenues and profits. KPI's may also contain aggregated customer information or other pre-calculated information. KPI's may be sorted by user or user category. KPI-set definition 242 includes logically defining the KPI's that are to be a part of the KPI-set, as well as defining the source of the KPI's. KPI-set deployment 244 and deployment control 246 include the deployment of the KPI-set to AAP 110.

The use cases shown in FIG. 2 include both design- and run-time use cases. At design-time, AAP administrator 200 is responsible for application definition 202, model deployment 204, prediction task definition 206, prediction task deployment 208, KPI-set deployment 210, KPI-lookup task definition 212, and KPI-lookup task deployment 214. Model deployment 204 includes model class import 216, model version import 218, and model version substitution 220.

Application definition 202 includes defining the scope of the particular CRM application. For example, AAP administrator 200 may define the applications shown in FIG. 1B, such as Internet sales/service 100, interaction center 102, or mobile sales/service 104. Model deployment 204 includes actually deploying of the model to be used within the system. In one implementation, deployment is restricted to specific roles. In this implementation, deployment controls may become part of the model definition. For example, the deployment of a specific model could be restricted to specific users/roles or also to specific applications. These deployment controls create a deployment authorization framework.

As part of model deployment 204, model class import 216 includes importing or manually defining the model class to be used. Model classes are containers for structurally equivalent models. The fields of model classes are a superset of all model fields of model versions belonging to the same class. Model versions are mining models within a model class. The model classes that can be used are ones that have been previously defined during model class deployment. In addition to importing the model class, AAP administrator 200 must also identify and import the model version, which constitutes model version import 218. The model version contains the most current model information. As time progresses, model information needs to be continually updated. As such, newer and more recent model versions may need to be imported into the system to substitute the older versions. Therefore, model deployment 204 also includes model version substitution. The model class and model versioning concepts allow an administrator to easily switch between different model versions by changing the version number, without needing to make completely new specifications for the new model versions. For example, mappings for the old model version can be inherited and re-used for the new model version, as model versions use the same data formats and model fields.

Prediction task definition 206 includes defining a prediction task that is to be deployed by the system. Prediction tasks are used by the application at run-time to obtain prediction information from analytical models. Prediction tasks may include prediction engine and mining model definitional information, so that the AAP may properly select these components for task execution at run time. These tasks may further include input field value information needed for execution of the tasks. Prediction task deployment 208 includes actual deployment of the prediction task within the application that had previously been defined during prediction task definition 206. Upon such deployment, the application has the capability to implement the prediction tasks later (i.e., at run time).

KPI set deployment 210 includes deployment of the KPI set within an application that had been previously defined during KPI set definition 242. Upon deployment, the KPI set is available for later use by the application at run time. KPI-lookup task definition 212 includes defining a KPI-lookup task that is to be deployed by the system. KPI-lookup tasks are used by the application at run-time to obtain KPI information. KPI sets are originally created by KPI set creator 240, as described earlier. KPI-lookup tasks may include KPI-set definitional information, so that the AAP may properly select the appropriate KPI-set used at run time during task execution. These tasks may further include input field value information needed for execution of the tasks. Lastly, KPI-lookup task deployment 214 includes actual deployment of the KPI-lookup task within the application. Upon such deployment, the application has the capability to implement the KPI-lookup tasks later (i.e., at run time).

At run-time, prediction task execution 224 and KPI-lookup task execution 226 occur while a front-end application, such as application 100, 102, 104, or 106 shown in FIG. 1B, processes a transaction with customer 222. In one implementation, customer 222 is involved in a session using Interaction Center application 102. An Interaction Center is an on-line interactive session between a customer and a call-center agent. The call-center agent has the ability to answer the customer's questions, and to provide feedback directly to the customer during the on-line session. Both the customer and call-center agent may use a web-based interface to communicate with one another. In another implementation, customer 222 is involved in a session using Internet sales/service application 100.

Prediction task execution 224 and KPI-lookup task execution 226 are initiated by requests sent from front-end applications 100, 102, 104, or 106. These front-end applications send requests to initiate the analytical tasks 224 or 226 as a direct result of real-time interaction with customer 222. Front-end applications 100, 102, 104, or 106 determine when requests for analytical tasks 224 or 226 are to be invoked as a result of the context and state of the transaction with customer 222.

KPI-lookup task execution 226 includes executing a run-time KPI-lookup task. This KPI-lookup task is one that had been previously defined and deployed at design-time. As noted earlier, KPI-lookup tasks utilize the KPI-sets to lookup KPI information that is sent back to the front-end applications.

Prediction task execution 224 includes executing a run-time prediction task. This prediction task is one that had been previously defined and deployed at design-time. As noted earlier, prediction tasks utilize mining models, such as predictive models. Prediction tasks use real-time information provided by the application to generate prediction results as output (e.g., customer attractiveness). In one implementation, prediction tasks also use KPI information (e.g., customer revenue) in generating predictions. An application may use the predictive output, along with business rules, to determine if customer 222 will be provided with special offers, promotions, and the like.

Figure 3A:
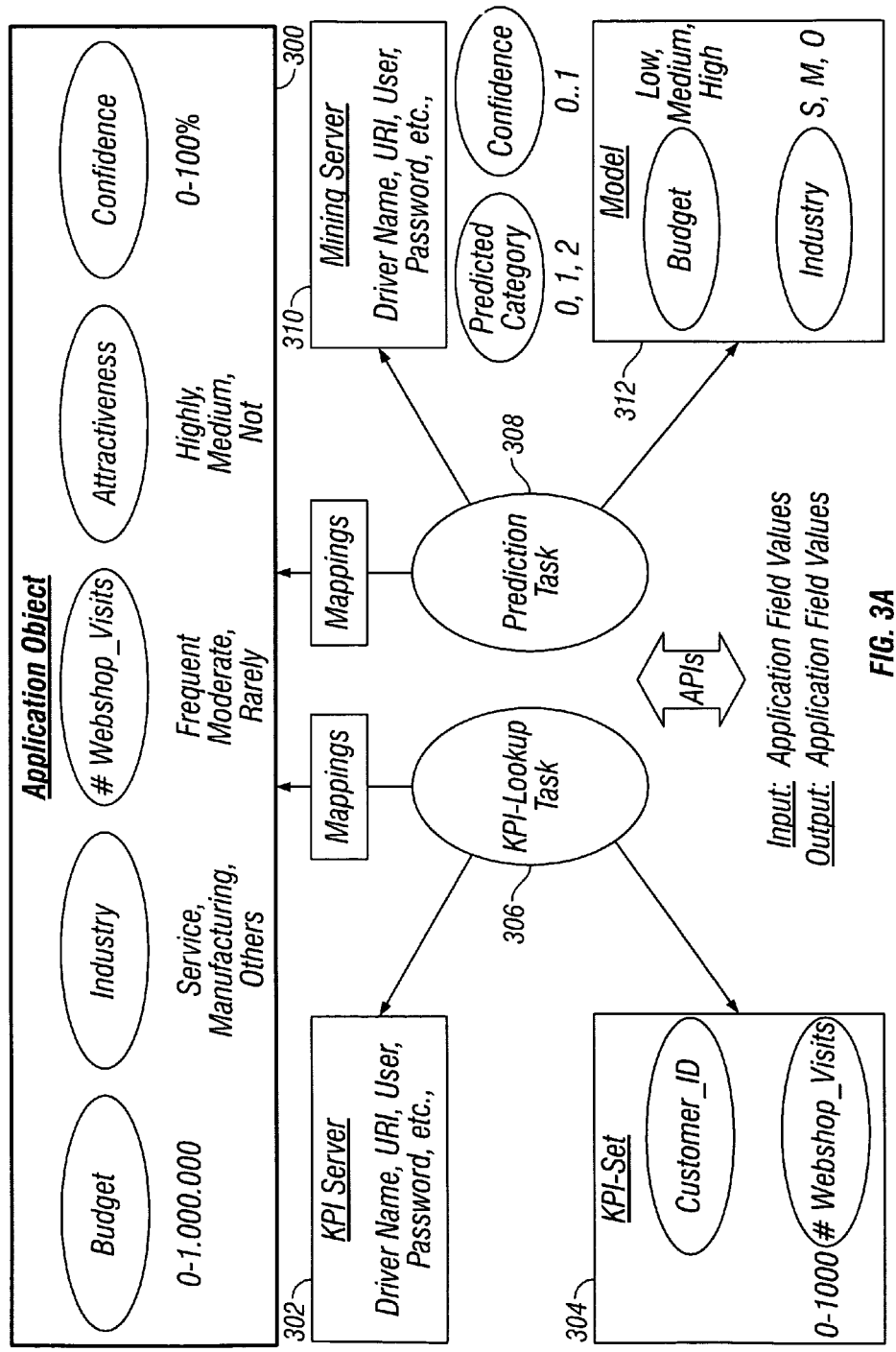
FIG. 3A is a conceptual diagram of an architectural design that provides mapping functionality for prediction and key performance indicator (KPI) lookup tasks.

FIG. 3A is a conceptual diagram of an exemplary object model for the AAP. The objects shown in FIG. 3A are included within an exemplary object model designed for the AAP. The design shows an implementation of how such tasks could be executed in a system such as the one shown in FIG. 1B. FIG. 3A shows how an application interacts with an AAP, such as AAP 110 shown in FIG. 1A, to implement KPI-lookup and prediction tasks. In particular, FIG. 3A shows various mappings between elements within an application object to elements used for KPI-lookup and prediction tasks.

FIG. 3A shows application object 300, KPI server 302, KPI set 304, mining server 310, model 312, KPI-lookup tasks 306, and prediction task 308. Application object 300 maintains information that can be provided by an application as input for the execution of tasks at run time. KPI server 302 manages KPI operations and interactions. Therefore, KPI server 302 keeps driver names for the drivers to connect to the KPI providers (engines), and user identifications, passwords, etc. as login credentials for the KPI providers. KPI server 302 manages these operations at run time to facilitate the functionality required for KPI-lookup tasks. KPI set 304 includes stored KPI information that can be retrieved during a KPI-lookup task. Mining server 310 manages prediction operations and model import/export. Therefore, mining server 310 keeps driver names for the drivers to connect to the mining providers (engines), and user identifications, passwords, etc. as login credentials for the mining providers. Mining server 310 manages these operations at run time to facilitate the functionality required for prediction tasks. Model 312 includes stored information for the predictive model used during a prediction task. In one implementation, model 312 and KPI set 304 represent data stores that are stored locally within the AAP, such as AAP 110 shown in FIG. 1A. Mining server 310 and KPI server 302 provide connections to mining providers and KPI providers. These providers can be local to the AAP (e.g., in the case of a local prediction engine), or can be connections to remote providers.

As shown in FIG. 3A, application object 300 contains various attributes, or fields. For example, application object 300 may contain a budget field, an industry field, a "# of webshop visits" field, an attractiveness field, and a confidence field. These fields include both input and output. Input fields are those maintained by application object 300 and used as input for either KPI-lookup or prediction tasks. Output fields are those obtained as output from the KPI-lookup or prediction tasks. The budget and industry fields are input fields. The "# of webshop visits", attractiveness, and confidence fields are output fields. The budget field indicates a given budget that applies to a given industry. The industry field indicates the type of industry (such as service, manufacturing, or other). These two input fields are used by model 312 (during prediction task 308) to help generate predictive output. This predictive output generates the output fields attractiveness (high, medium, or none) and confidence level (0-100%). The attractiveness field indicates whether an individual is an attractive candidate, and the confidence field indicates the confidence rating of the prediction. These output fields can be used in coordination with business rules to determine if a given customer will be given a special offer or promotion. For example, if the customer is predicted as a highly attractive one with a 75% (or higher) confidence rating, the business rules would indicate that a special promotion should be offered. The "# of webshop visits" field is also an output field. The value of this output field is provided by KPI set 304 to indicate if an individual has visited a webshop frequently, moderately, or rarely. In one implementation, the "# of webshop visits" field may also be used as input for prediction task 308.

An operational CRM system implements KPI-lookup tasks and prediction tasks (such as tasks 306 and 308), as shown in the example in FIG. 3A. KPI-lookup task 306 uses KPI server 302 and KPI set 304 and provides for the run-time functionality of looking up KPI information. This KPI information is then sent back to application object 300. This KPI information may be used directly by application object 300, or may additionally be used as input to a prediction task, such as prediction task 308.

KPI-lookup task 306 will be initiated by the application in FIG. 3A, and will use input information as specified in application object 300. Although not shown, application object 300 may provide a customer ID that will be used by KPI-lookup task 306. In one implementation, the customer ID is an input field in application object 300. KPI-lookup task 306 uses KPI server 302 to help manage the functionality required for run-time execution of the task. In addition, KPI-lookup task 306 will use the input information from application object 300 to obtain the requested KPI information from KPI set 304. In one implementation, KPI-lookup task 306 contains mapping information for use by the AAP to translate field information in application object 300 to field information used by KPI set 304. In addition, KPI-lookup task 306 also contains mapping information for use by the AAP to translate field information from KPI set 304 back to application object 300. This mapping functionality may be required to directly map field elements, or to also possibly convert between differing field data types. For example, KPI set 304 maintains a "# of webshop visits" field having values from 0-1000. Application object 300, however, maintains a separate "# of webshop visits" field having the values of "frequent," "moderate," and "rare." Thus, these separate fields in KPI set 304 and application object 300 do not have the same data type. KPI-lookup task 306 contains mapping functionality to translate the values from one "# of webshop visits" to the other. For example, the mapping functionality may designate that "# of webshop visits" in KPI set 304 having values between 0-50 map to the value of "rare" within application object 300. Similarly, values between 51-600 may map to the value of "moderate," and values between 601-1000 may map to the value of "frequent." These and other forms of mapping functionality may be utilized by KPI-lookup task 306.

In some implementations, prediction task 308 or KPI-lookup task 306 may require input that is not available to, or provided by, application object 300. In these implementations, the mapping functionality provides the missing information. This information could include certain default values or constants. In some implementations, the mapping functionality dynamically determines the input that is provided to the task based on the context of the information in application object 300.

Prediction task 308 uses mining server 310 and model 312 to help manage the functionality required for run-time execution of the task. Prediction output information is provided to application object 300, which may later be processed by one or more business rules. At run time, an application initiates prediction task 308 and provides input information, such as budget and industry information. Prediction task 308 processes this input information in model 312 in using mining server 310. Model 312 is a predictive model that is capable of generated predictive output when processed by mining server 310. Model 312 uses the input information for budget and industry and generates predictive output for an attractiveness category and for confidence. The predictive output is then sent back to application object 300. Prediction task 308 also contains mapping information for use by the AAP to map field values between application object 300 and model 312. For example, both application object 300 and model 312 contain budget and industry fields. These are input fields. In general, input fields may be used to hold a wide variety of information, including customer or attribute information. However, the field data types often need to mapped to one another. In some cases, direct mapping is possible between field values. For example, the industry field values in application object 300 (service, manufacturing, and others) can be directly mapped to the industry field values in model 312 (S, M, O) because these field values have substantially the same data types. In other cases, indirect mapping, or conversion, is required. For example, the budget field values in application object 300 (0-1,000,000) cannot be directly mapped to the budget field values in model 312 (low, medium, high). Therefore, the AAP needs to be capable of translating between these field values using an indirect, or conversion, function. For example, values from 0-100,000 may be mapped to "low." Similarly, values from 100,001-700,000 may be mapped to "medium," and values from 700,001-1,000,000 may be mapped to "high."

Additionally, both application object 300 and model 312 contain predicted attractiveness category and confidence fields. These are output fields. These fields also must be mapped to one another. Prediction task 308 uses model 312 and mining server 310 to generate an attractiveness category of 0, 1, or 2. These must be mapped to the attractiveness field values for application object 300 of high, medium, and none. In one example, an attractiveness category of 0 could be mapped to a value of none, while a category of 2 could be mapped to a value of high. Prediction task 308 also uses model 312 and server 310 to generate a confidence of 0 . . . 1. These must be mapped to the percentages (0-100%) of the confidence field in application object 300. These and other forms of mapping functionality may be utilized by the AAP for prediction task 308.

Figure 3B:
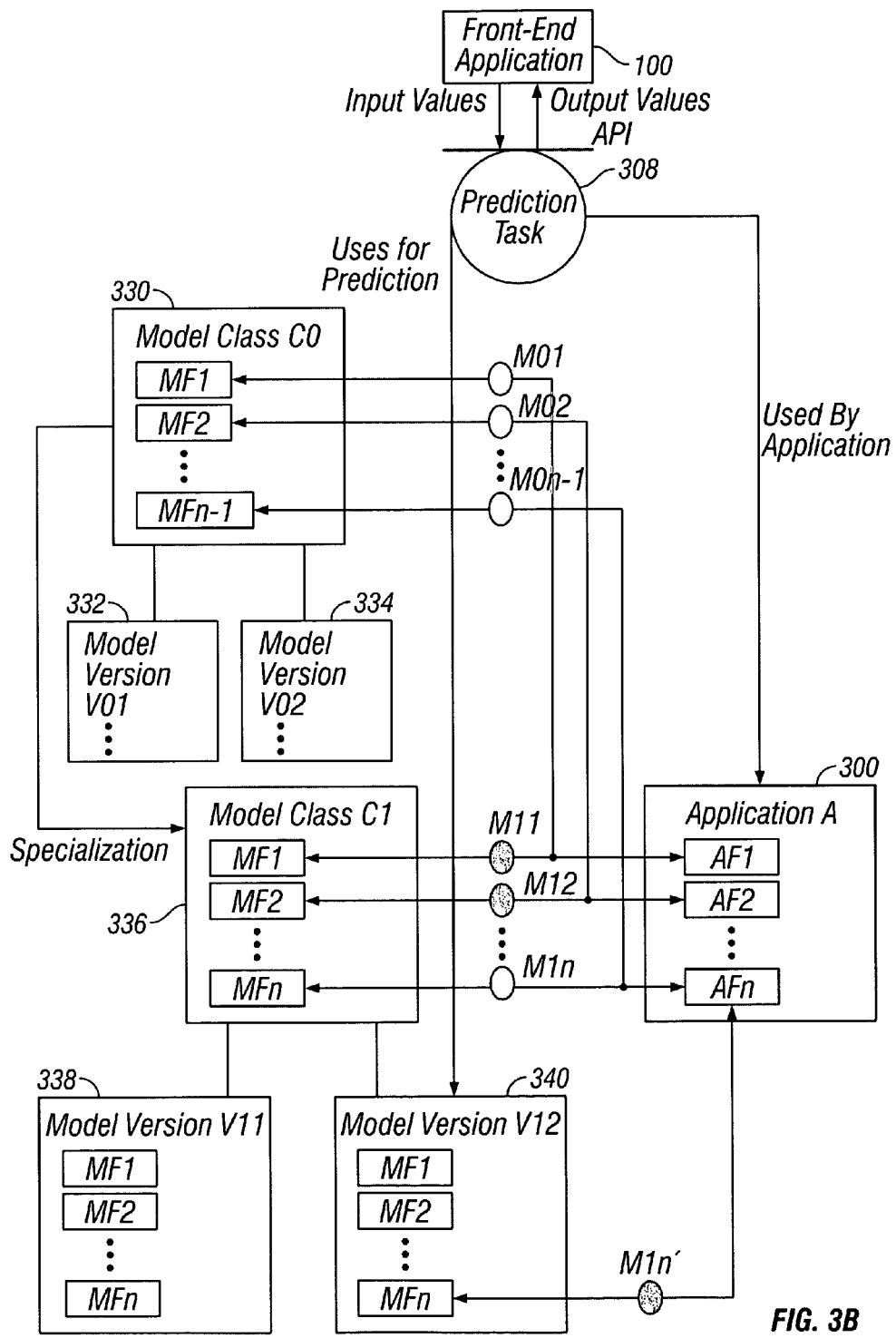
FIG. 3B is a conceptual diagram of an architectural design for using multiple versions of data mining models, according to one implementation.

FIG. 3B is a conceptual diagram of an architectural design for using multiple versions of data mining models, according to one implementation. FIG. 3B illustrates the concept of model classes and versions. Front-end application 100 initiates a request to execute prediction task 308 to perform a prediction based on a particular data mining model version. To execute a single prediction, front-end application 100 uses the prediction application interface (API) of prediction task 308 shown in FIG. 3A. It uses the API to pass input values for application fields to prediction task 308 for task execution, and upon such execution, front-end application obtains output values for the prediction output application fields of prediction task 308.

Application object 300, which is also shown in FIG. 3A, contains a list of all application fields (AF1, AF2, . . . , AFn). These application fields provide the interface between front-end application 100 and prediction task 308. That is, front-end application 100 sets values for input application fields, such as fields AF1 and AF2, in application object 300. Front-end application 100 also gets back values for output application fields, such as field AFn, after the processing of prediction task 308. All further internals and details of prediction task 308 are transparent to front-end application 100.

The actual real-time prediction is based on a data mining model version. For example, this model version could be a decision tree model, which was trained with customer data as of 2002. The various model versions shown in FIG. 3B are model versions 332, 334, 338, and 340 (which correspond to model versions V01, V02, V11, and V12, respectively). Each model version belongs to a model class. A model class is a group of model versions trained with the same mining function (e.g., classification, regression, or clustering) and with the same logical data. FIG. 3B shows model classes 330 and 336 (which correspond to model classes C0 and C1, respectively). Model versions 332 and 334 are each versions of model class 330. Model versions 338 and 340 are each versions of model class 336. Model versions of the same model class typically differ in the selection of the data instances used for training. For example, model version 338 could be trained by using customer data as of 2001, while model version 340 could be trained with customer data as of 2002. In some implementations, all model versions of the same model class have the same model fields, as the model fields are the result of using the same logical data. Model class 330 includes input fields MF1 and MF2, and also includes output field $MF_{n-1}$. Model class 336 includes the same fields as its parent, or super, model class 330, but also includes additional output field MFn.

Models can be arranged in a hierarchy of model classes. For example, model class 336 may be more specific than model class 330, as only a single additional attribute (MFn) was used to train models in model class 336, as compared to model class 330.

The model class and versioning architecture shown in FIG. 3B allows the application-oriented organization of mining models for easy administration. If prediction task 308 is configured to use a given model version, it can easily be re-configured to use another model version of the same model class or of all more generic, or super, classes. For example, if prediction task 308 is configured to use model version 340 (as shown in FIG. 3B), it can be re-configured to use model version 338, model version 332, or model version 334. The reason for this easy switch is that if an application already provides all input values for the input application fields, and if these values can be passed to the given model version 340 as prediction input, then all given information can also be used to process a prediction on another model version of the same class (such as model version 338), or a model version of a model super-class (such as model versions 332 or 334 from model class 330).

Additional consideration for the specification of prediction task 308 comes from the specification of mappings between application fields and model fields. For example, the categorical field values "male" and "female" for the application field AF1 may have to be mapped to the values "0" and "1" for model field MF1. The model class/versioning technique allows the easy and systematic re-use and specialization of mappings due to the inheritance of mappings along the class hierarchy. The following mappings can be specified:

a. Class-Level Mappings. Mappings can be specified between an application field and a model class field, even without having a model version instance for the model class. For example, the task designer may know that all model versions of the class use "0" and "1" for a customer gender field MF1 and that the application deals with values "male" and "female" in application field AF1. In this case, the task designer can specify a mapping M01 for model class 330, and a mapping M11 for model class 336. Mappings can be inherited from super-classes and overwritten. For example, if the mapping M01 already exists, and if the task designer wants to re-use this mapping for model class 336, the task designer can simply do so. If, however, the task designer wants to specify a new mapping for the field MF1, the task designer can overwrite mapping M01 with mapping M11.

b. Version-Level Mappings. The most specific mapping is that between an application field and the field of a model version. For example, for model version 340, there may be a specific mapping $M1n'$ between application field AFn and model field MFn. All mappings given for the field of a model class can be inherited by the model versions of this class. For example, for model field MFn in model version 340, the model class mapping $M1n$ could be inherited. The inherited mappings, however, can also be overwritten by specifying an explicit version-level mapping M1n'. This mapping "overwrites" the inherited mapping M1n given for model class 336.

Through the application of object-oriented programming concepts to the organization of mining models, the maintenance of many mining models in the real-time analytical framework becomes significantly facilitated. The organization of models along a class hierarchy with inheritance of mappings, and the grouping of structurally equivalent model versions in classes, allow task designers to "attach" new models to applications, and to switch applications between different model versions with minimum effort.

FIG. 4 through FIG. 9 show displays of various screens that are used in designing or creating various components used in a real-time analytics system, such as the system shown in FIG. 1B. A user or administrator may use the menus and options shown on these screen displays for performing some of the use cases shown in FIG. 2, such as application definition, model definition, KPI-set definition, prediction task definition, KPI-lookup task definition, and the like. These screen displays are shown for exemplary purposes only.

Figure 4:
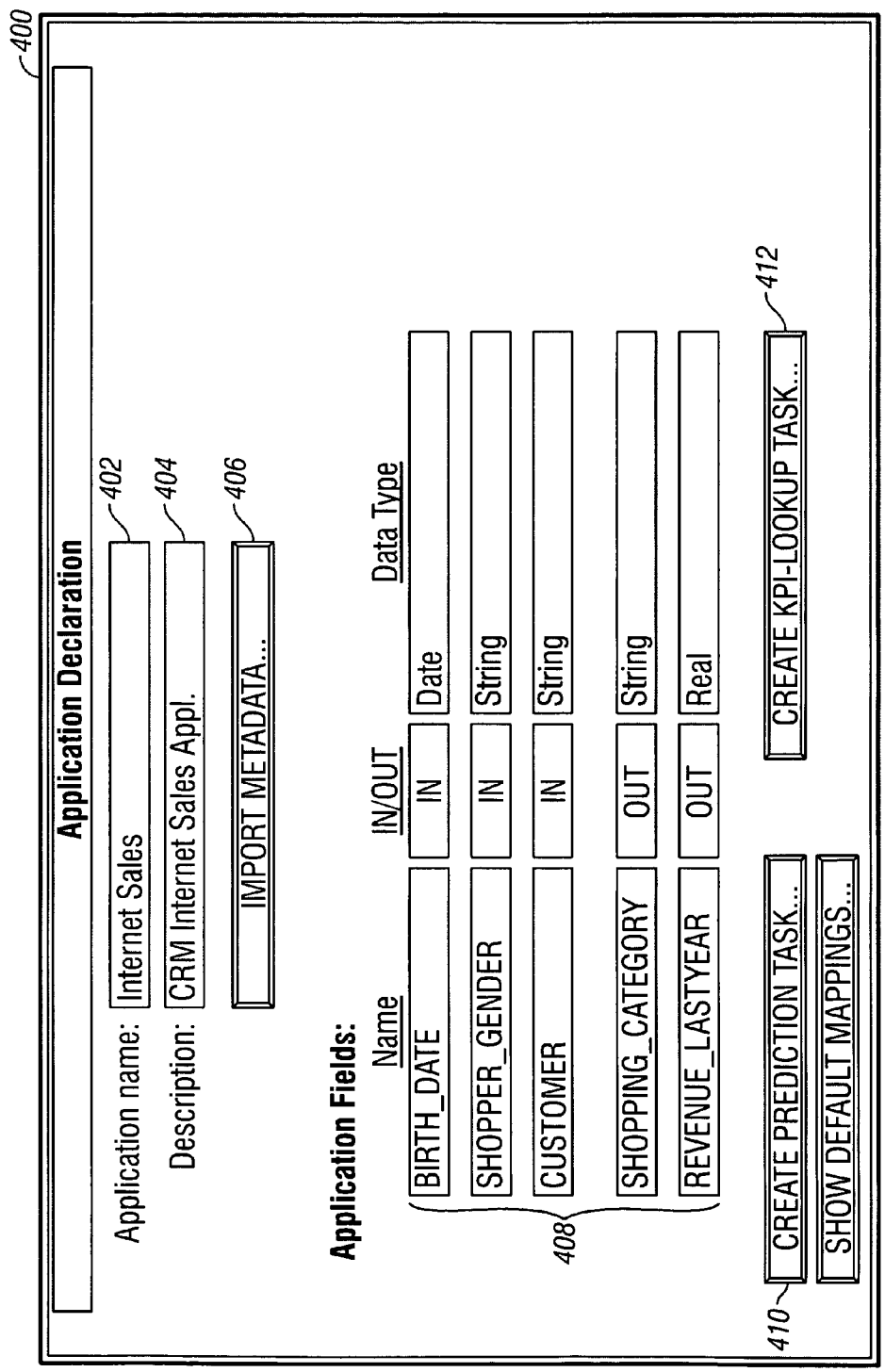
FIG. 4 is a screen display of an application declaration, according to one implementation.

FIG. 4 is a screen display of a front-end application declaration, according to one implementation of the invention. In this implementation, screen display 400 shows an application declaration that is used during the application definition process, such as application definition 202 shown in FIG. 2. During this process, an administrator is able to set up a front-end application that is capable of using real-time analytics functionality by invoking prediction or KPI-lookup tasks.

Screen display 400 shows a page for application declaration. This page includes name field 402, description field 404, import button 406, application fields 408, prediction task button 410, and KPI-lookup task button 412. In the example shown, name field 402 shows that the application name is "Internet Sales." Description field 404 indicates that the application is a CRM Internet sales application, such as Internet sales/service application 100 shown in FIG. 1B. Import button 406 allows a user to import metadata into the application declaration automatically, thereby relieving the user of having to manually enter the information. In one implementation, this is achieved by selection of a specification, such as a business object specification, that has been previously registered into the AAP. When a user, such as an administrator, imports this specification, all attributes are automatically imported into the declaration application.

Application fields 408 specify the specific processing fields used by the application at run time. Each application field has a name, an in/out designation, and a data type. The name is a unique name within the set of application fields 408. The in/out designation specifies whether an application field is used as input to a prediction or KPI-lookup task, or whether the field is used for output generated by the prediction or KPI-lookup task and sent back to the application. The data type indicates the type of data stored in the application field as a value. The data types shown in FIG. 4 are date, string, and real (i.e., floating point).

Prediction task button 410 and KPI-lookup button 412 are used by the administrator to create real-time tasks that are to be associated with the application. The administrator may select button 410 to create a prediction task and button 412 to create a KPI-lookup task. At run-time, after an application has been defined in the AAP, mining models can be used to allow the application to perform prediction, and KPI sets can be used to allow the application to perform KPI lookups as well.

Figure 5A:
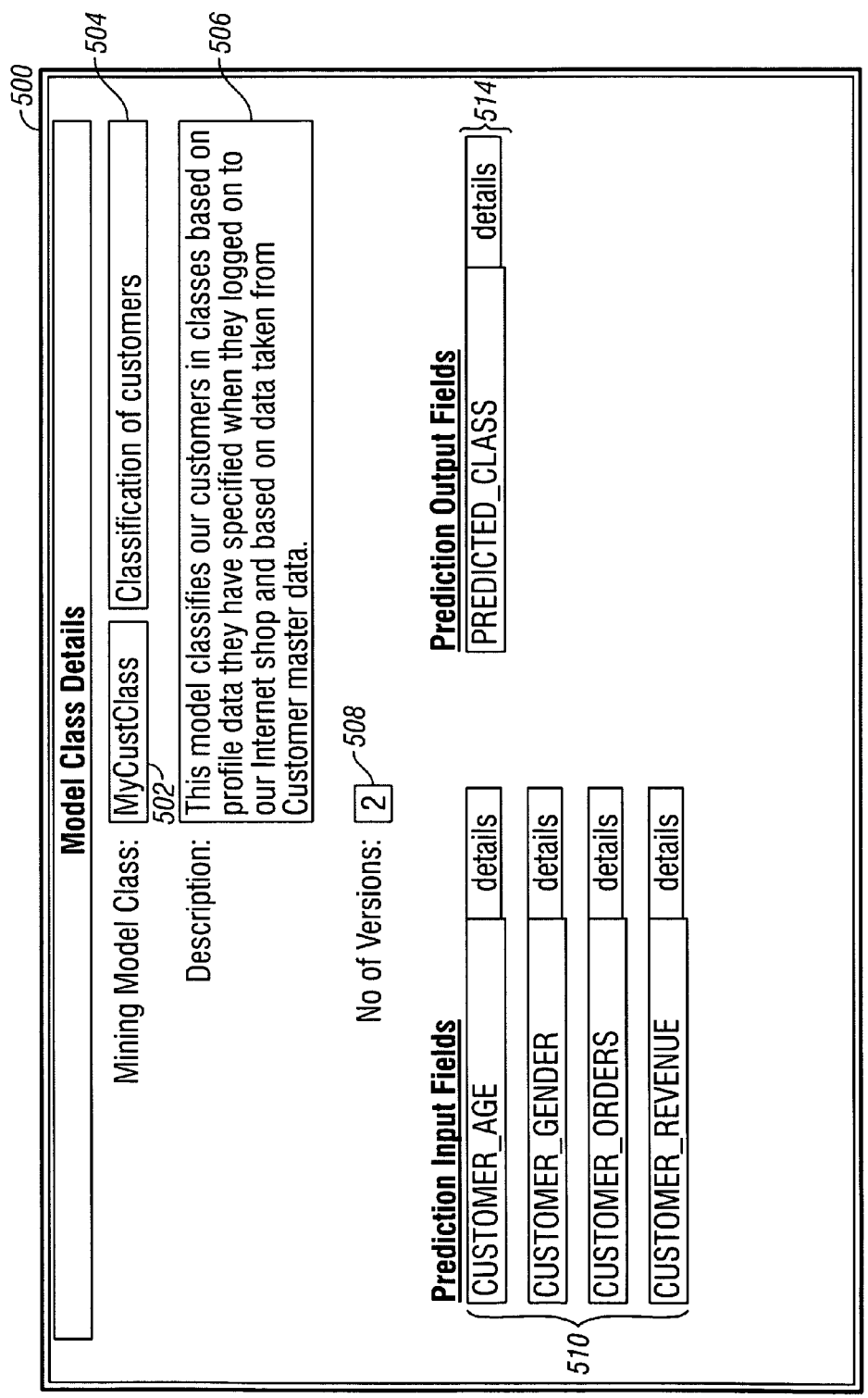
FIG. 5A is a screen display of a mining model class, according to one implementation.

FIG. 5A is a screen display of a mining model class, according to one implementation of the invention. In this implementation, screen display 500 shows the details of a mining model class that has been either manually specified by an AAP administrator or that has been automatically created by the AAP when a model version has been deployed for the model class. An AAP administrator may manually specify the model class if the set of fields is known. Alternatively, the AAP is able to automatically define the model class when it imports a version of the model class. The fields can be derived from the model version and used for the specification of the model class.

Screen display 500 shows a page for the details of a model class. Screen display 500 includes class name field 502, classification field 504, description field 506, version field 508, prediction input fields 510, and prediction output fields 514. As shown in the example in FIG. 5A, class name field 502 indicates that the name of the mining model class is "MyCustClas." Classification field 504 indicates that the model class is used for the classification of customers. Description field 506 provides the high-level description of the model class. This description is entered by the model creator. Version field 508 indicates the number of different versions that exist for the model class. A model class can have one or more versions. Later versions of the class may contain more specific or up-to-date information. The model class shown in FIG. 5A has two different versions.

Prediction input fields 510 and prediction output fields 514 indicate the input and output fields that are used for prediction by the mining model. The mining model obtains values for the input fields from the application to generate predictive output. This predictive output is captured in the prediction output fields and sent back to the application. As shown in FIG. 5A, the prediction input fields 510 include CUSTOMER_AGE, CUSTOMER_GENDER, CUSTOMER_ORDERS, and CUSTOMER_REVENUE. The values for these fields originate in the application and are provided to the model class through the execution of prediction tasks, in one implementation. The prediction output fields 514 include the PREDICTED_CLASS field. The value of this field is sent back to the application after the prediction has been generated.

Details buttons are used for providing detailed information about the fields. The model creator may select one of these buttons to view or enter detailed information about prediction input fields 510 or about prediction output fields 514.

Figure 5B:
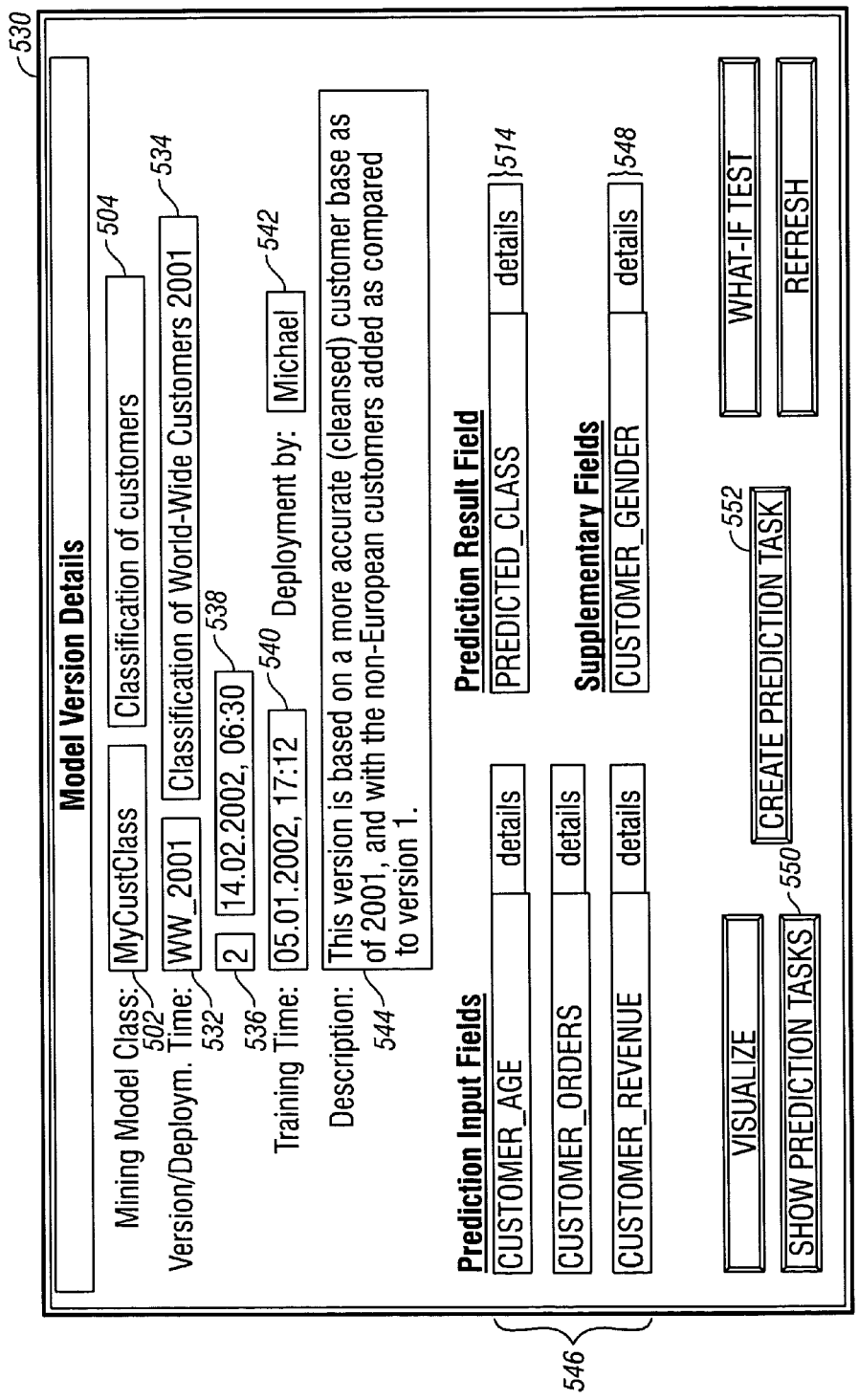
FIG. 5B is a screen display of model version details for the mining model class shown in FIG. 5A.

FIG. 5B is a screen display of model version details for the mining model class shown in FIG. 5A. The model shown in the example of FIG. 5B is a version of the model that was earlier described in FIG. 5A. An administrator is capable of defining one or more versions of a mining model. In one implementation, all model versions have a compliant set of logical attributes. That is, the fields of a model version are a subset of the model class fields, and the data type of the model version field is the same or a more specific one than that of the model class. For example, if the data type of the model class field CUSTOMER_AGE is an integer, then the data type of a model version field of CUSTOMER_AGE may be a real number.

In screen display 530 shown on FIG. 5B, field 532 indicates the name of the specific model version, and field 534 provides a brief description of the version. Version field 536 indicates the version number, and deployment time field 538 provides the date and time to indicate when the model version was deployed. By looking at these fields, an administrator is able to determine how current a given model version is. Training time field 540 indicates when the model version was trained, and field 542 provides information to indicate who deployed the model version. Description field 544 provides a more detailed description of the model version. In the example shown in FIG. 5B, description field 544 indicates that the model version is based on a more accurate customer base as of 2001 and includes non-European customers.

In FIG. 5B, prediction input fields 546 are a subset of those shown from fields 510 in FIG. 5A. Notice that prediction input fields 546 include only CUSTOMER_AGE, CUSTOMER_ORDERS, and CUSTOMER_REVENUE. They do not include CUSTOMER_GENDER, which is included in the set of fields 510 of FIG. 5A. Instead, the CUSTOMER_GENDER field is included in the set of supplementary fields 548. In one implementation, supplementary fields 548 are not necessary, as input, to the prediction process. In this implementation, supplementary fields 548 are still included in the definition, and mapping functionality for these fields is still provided. The reason for this is that supplementary fields 548 may become required fields for the prediction task in the next version of the model used for the predictions, and this facilitates the dynamic substitution of one model version to the next. This structure demonstrates that a model version may have a slightly different organization than its model class. FIG. 5B shows that the model version contains the same set of prediction output (i.e., result) fields 514 as the model class.

Button 550 is used for showing all prediction tasks that are associated with the given model version. In addition, button 552 may be selected for creating a new prediction task to be associated with the model version. These prediction tasks are also associated with the host application, according to one implementation.

Figure 6A:
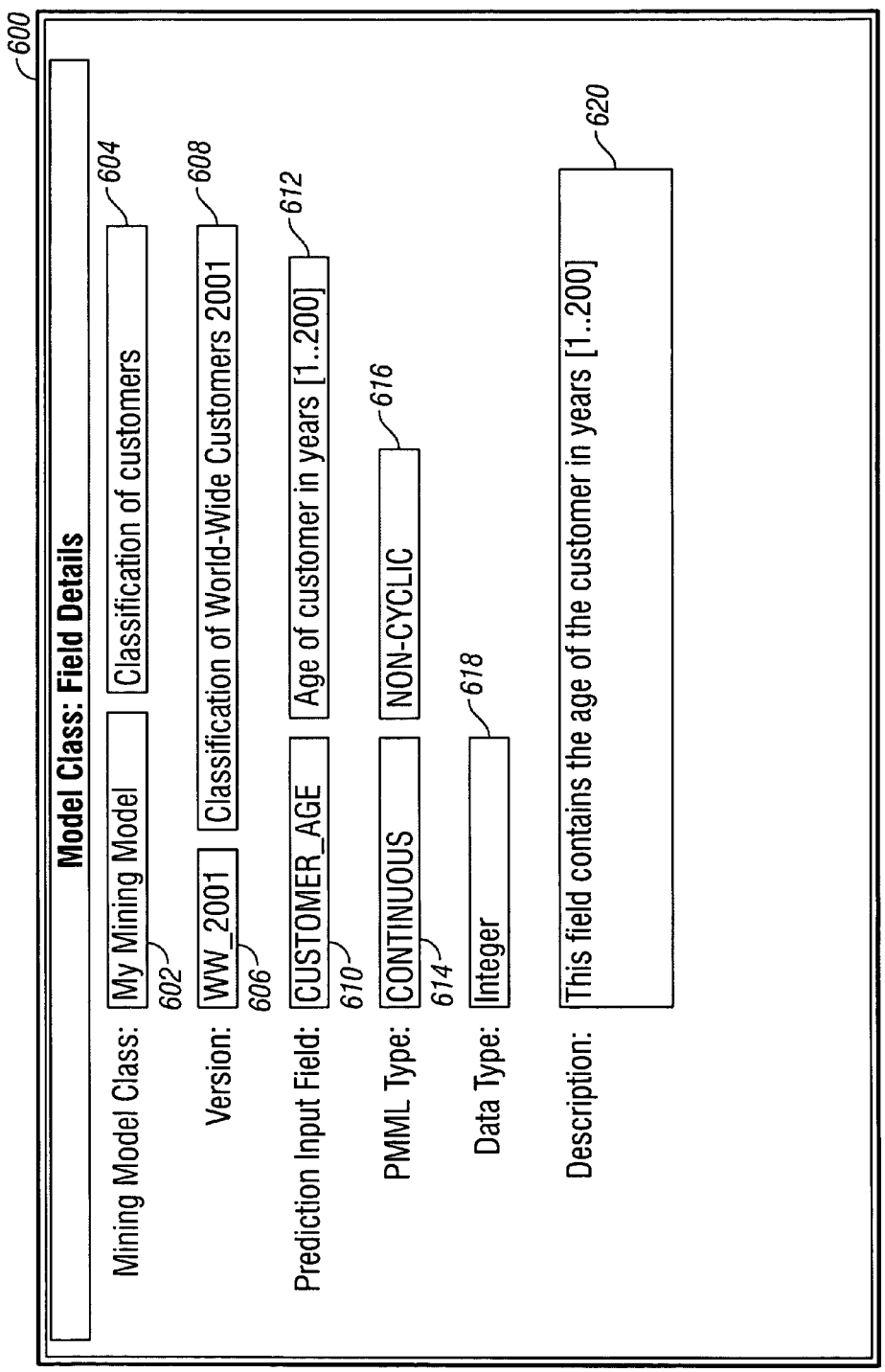
FIG. 6A is a screen display of field details for a model class, according to one implementation.

FIG. 6A is a screen display of field details for a model class, according to one implementation of the invention. FIG. 6A shows the details for the prediction input field of CUSTOMER_AGE that was shown in FIG. 5A. In one implementation, a model creator selects one of the details buttons to bring up the page shown in screen display 600 to view or entered detailed information about this input field.

Screen display 600 shows a page having various fields. These include class reference field 602, classification field 604, version field 606, version description field 608, prediction reference field 610, data description field 612, model type fields 614 and 616, data type field 618, and general description field 620. Class reference field 602 shows the mining model class with which the prediction field is associated. In the example shown, the associated class is "My Mining Model." Classification field 604 refers to the classification used for the class.

Version field 606 shows the class version being utilized. As described earlier, a mining model class may have one or more versions. The version shown in FIG. 6A is "WW_2001," which is used for the classification of World Wide customers in 2001, as indicated by version description field 608. Prediction reference field 610 indicates the name of the prediction field for which details are provided. As shown, the field is the CUSTOMER_AGE prediction input field, and data description field 612 indicates that this field designates the age of customers in the year range [1 . . . 200]. Model type fields 614 and 616 specify the model type for the model class. In the example shown in FIG. 6A, the model is one defined using the Predictive Modeling Markup Language (PMML), and the PMML types are continuous and non-cyclic. Data type field 618 indicates that the CUSTOMER_AGE field contains integer values. Lastly, general description field 620 provides a brief general description of the CUSTOMER_AGE field.

Figure 6B:
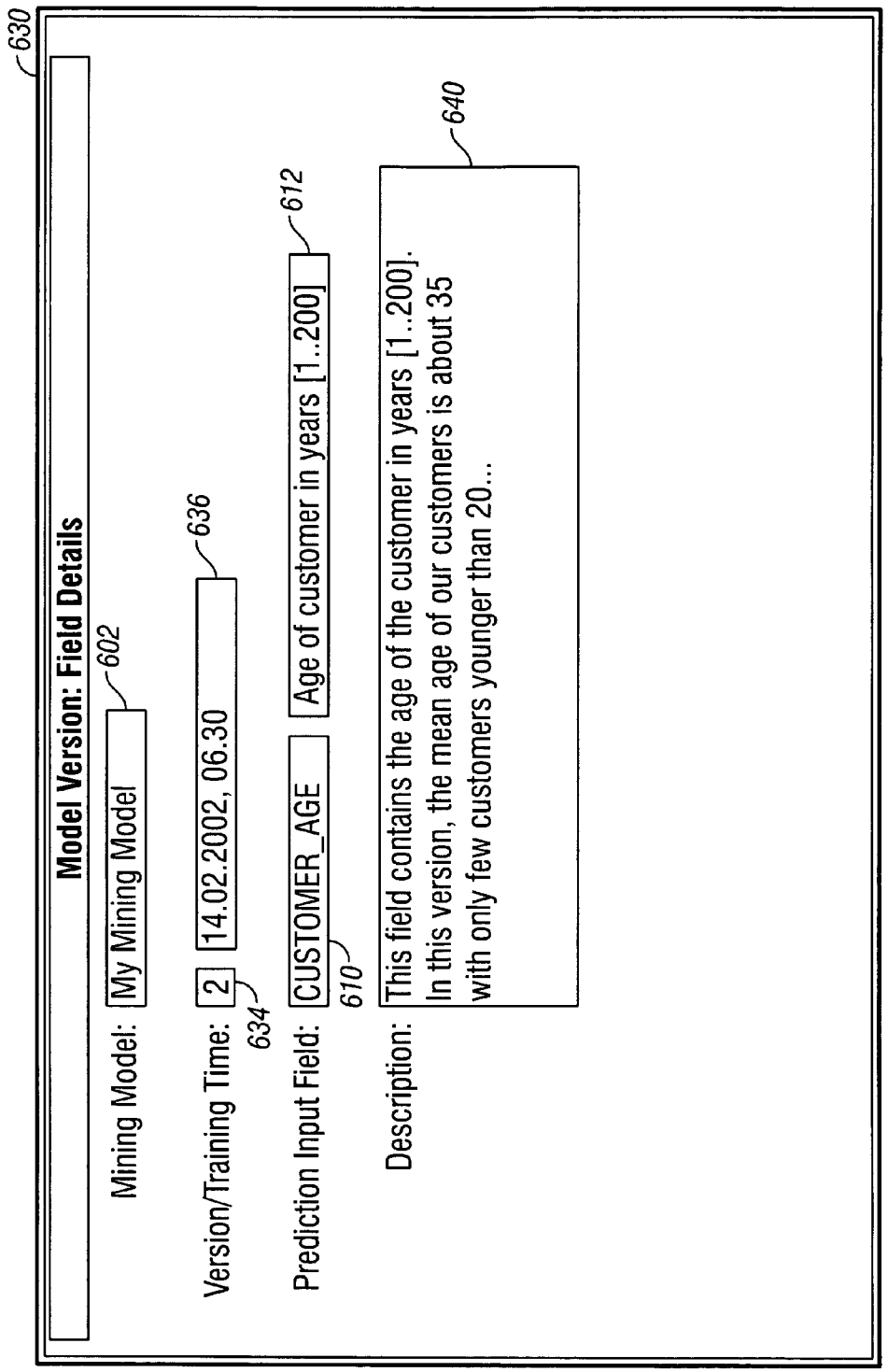
FIG. 6B is a screen display of field details for a model version, according to one implementation.

FIG. 6B is a screen display of field details for a model version, according to one implementation. In this implementation, a screen display 630 shows the field details for a specific field in a model version that is based on the field for the model class shown in FIG. 6A. A user, such as a designer, can create these field details for a given model version. The screen display 630 shows the class reference field 602, a version identifier field 634, a training time field 636, the prediction reference field 610, the data description field 612, and a field description field 640. Each of these fields provide information about a particular element used in the model version.

As noted in FIG. 6A, the class reference field 602 shows the mining model class for the model version. Each model version contains a reference to its base model class. The version identifier field 634 shows the unique version number associated with the model version. The training time field 636 shows the exact time when the model version was trained, or updated, with the new field information. The prediction reference field 610 shows the name of the prediction input field (which refers to the same field name shown for the model class in FIG. 6A), and the data description field 612 shows the high-level description of the field. Lastly, the field description field 640 shows a more detailed description of the field for the model version. In the model version shown in FIG. 6B, the field description field 640 indicates that the mean age of the customers (in the "CUSTOMER_AGE" field) is approximately 35, and only a few customers are younger than 20. In this fashion, the field description field 640 is capable of providing information about a field that is particular to the model version.

Figure 7A:
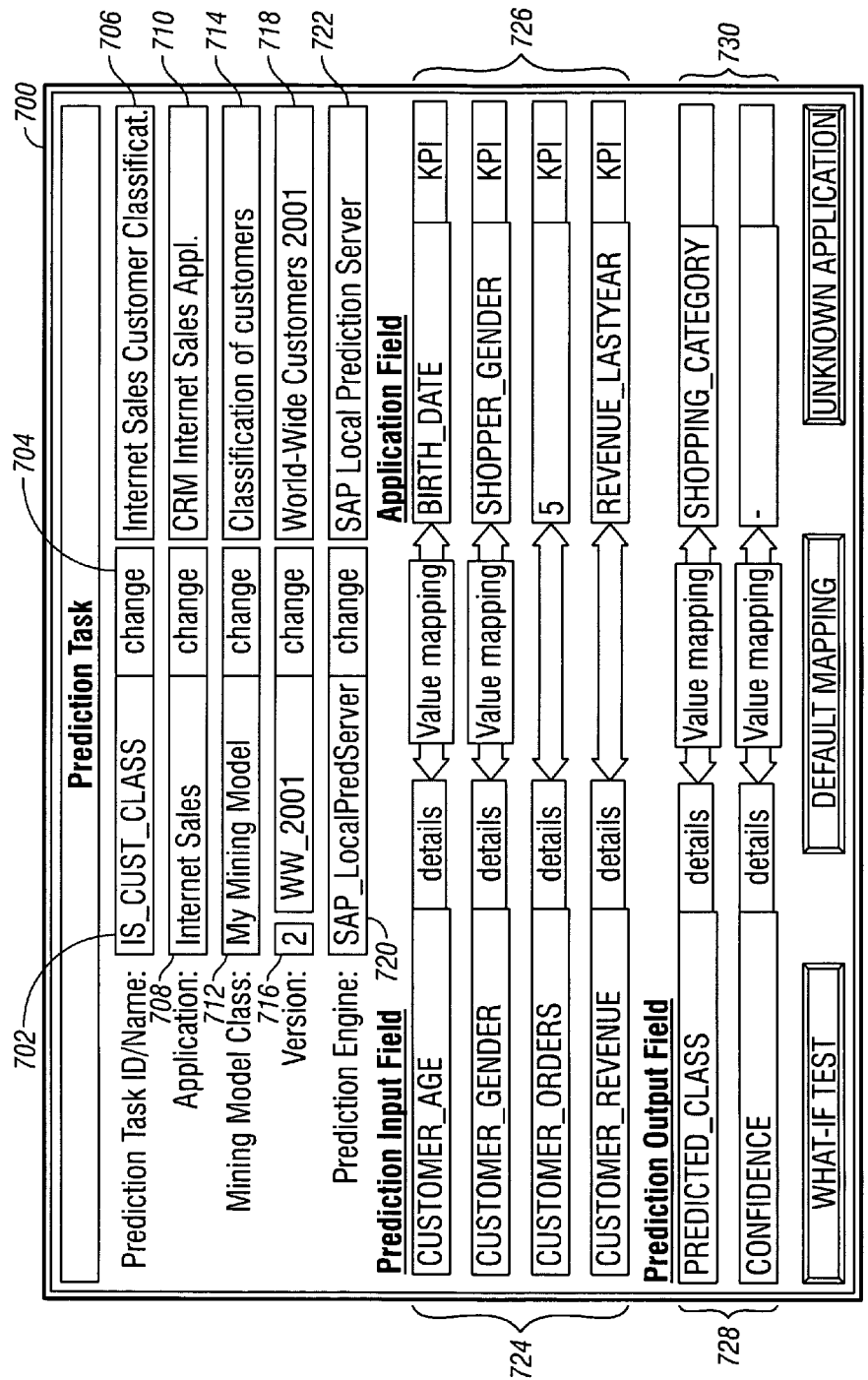
FIG. 7A is a screen display of a prediction task, according to one implementation.

FIG. 7A is a screen display of a prediction task, according to one implementation of the invention. In this implementation, screen display 700 shows how an administrator, such as AAP administrator in FIG. 2, is able to define a prediction task. A prediction task is an analytical task, in one implementation. A prediction task is initiated by an application, such as an Internet sales application, to obtain predictive output. The prediction task has a format that includes a set of input and output fields. The application initiates the task by sending a request to the AAP using a real-time task interface. The predictive output is then used by the application to initiate subsequent events, such as offering a special promotion to a valued customer. A system, such as AAP 110 shown in FIG. 1A, processes the information contained in the prediction task to help determine the logistics for executing the task. For example, AAP 110 is able to use the information provided in the prediction task to identify the mining model class and prediction engine that are to be used in executing the task. AAP 110 is also able to identify the application and prediction fields that are used for task execution, and the pertinent value mappings between such fields.

In FIG. 7A, screen display 700 shows a page for defining a prediction task. The page contains various fields. An administrator can use these fields to enter, review, and revise the definition of the prediction task. Name field 702 indicates the name (or identifier) of the prediction task. The administrator may select button 704 to change the contents of name field 702. Name description field 706 provides a brief description of the name of the prediction task. Application field 708 indicates the type of application that will be utilizing the prediction task. As shown in the example in FIG. 7A, the application is an Internet sales application. Application description field 710 provides a brief description of the application.

Model class field 712 indicates the name of the mining model class that will be used to implement the predictions. Model class description field 714 provides a brief description of the model class that is used. Version field 716 indicates the version number of the mining model specified in model class field 712. There may be one or more versions of the model, and version field 716 specifies which version will be used by the prediction task. As shown in FIG. 7A, version field 716 indicates that version "2" corresponding to "WW_2001" is to be used. Version description field 718 provides a brief description of the version. Prediction engine field 720 indicates the prediction engine that will be used for generating the predictive output. The prediction task uses the mining model in the prediction engine to generate this output. The prediction engine may be either a local or remote engine. Engine description field 722 provides a brief description of the prediction engine that is used.

Prediction input fields 724 are those set of fields used as input to the prediction process. Typically, the values for these fields are provided by the application, such as an Internet sales application. These input fields provide the mining model with the information that is used to generate predictions. As shown, the input fields are CUSTOMER_AGE, CUSTOMER_GENDER, CUSTOMER_ORDERS, and CUSTOMER_REVENUE. Although the values for these fields are provided by the application, there is not always a direct mapping of the fields that are maintained by the application and those maintained by the mining model. For example, application fields 726 do not have the same field names (or value types, in some cases) as prediction input fields 724. Therefore, in some instances, a mapping function is utilized. This mapping function is included within the scope of the prediction task. To give an example, the value of the application field of BIRTH_DATE is mapped to an age as specified by the CUSTOMER_AGE prediction input field. The prediction task uses the birth date to determine a current age. This type of mapping utilizes a conversion function. The mapping function does not require any conversion in some instances. For example, the application field of SHOPPER_GENDER can be directly mapped to the CUSTOMER_GENDER prediction input field. All of application fields 726 are mapped in some fashion to prediction input fields 724 within the prediction task.

Prediction output fields 728 contain values that are generated as a result of prediction processes. As shown in the example in FIG. 7A, these fields include the PREDICTED_CLASS and CONFIDENCE fields. The value for these fields are sent back to the application as predictive output. However, the application has a separate set of output fields 730 to capture this predictive output. Therefore, the prediction task also has a mapping functionality to map prediction output fields 728 to output fields 730 for the application. Note that the prediction output field of CONFIDENCE has no corresponding output field used by the Internet sales application in the example shown in FIG. 7A.

Application fields 726 include KPI buttons in one implementation of the invention. In this implementation, a prediction task can be combined with a KPI-lookup task. This is done when a KPI is used as an input to the prediction process. Thus, KPI buttons are provided for each application field that is used for prediction input. If an administrator selects this button, a KPI-lookup task is selected for delivering a KPI, and the delivered KPI will be assigned to the model field. This type of assignment creates an automatic invocation of the KPI-lookup task as a prerequisite to the prediction task. As shown in FIG. 7A, the REVENUE_LAST YEAR field will be the result of a KPI-lookup task if the administrator has selected the KPI button located to the right of this field. In this case, the results of the KPI-lookup task will be mapped to the CUSTOMER_REVENUE prediction input field. Any input values required for a given KPI-lookup task are also listed as part of the prediction task as well, according to one implementation. In this implementation, all input values for the KPI-lookup and prediction tasks are grouped together and provided in a unified set of input values.

In one implementation, an application can easily switch between model versions simply by changing the version number, without specifying a new mapping between the application and the model version. If a prediction task gets switched to another version, it inherits the mappings between application fields 726 and prediction input fields 724, and also inherits the mappings between prediction output fields 728 and fields 730. These mappings can be overridden, or changed, to consider the specifics of the model version. For example, if the new model version has fewer fields than the previous model version, then the mappings can be changed accordingly.

Figure 7B:
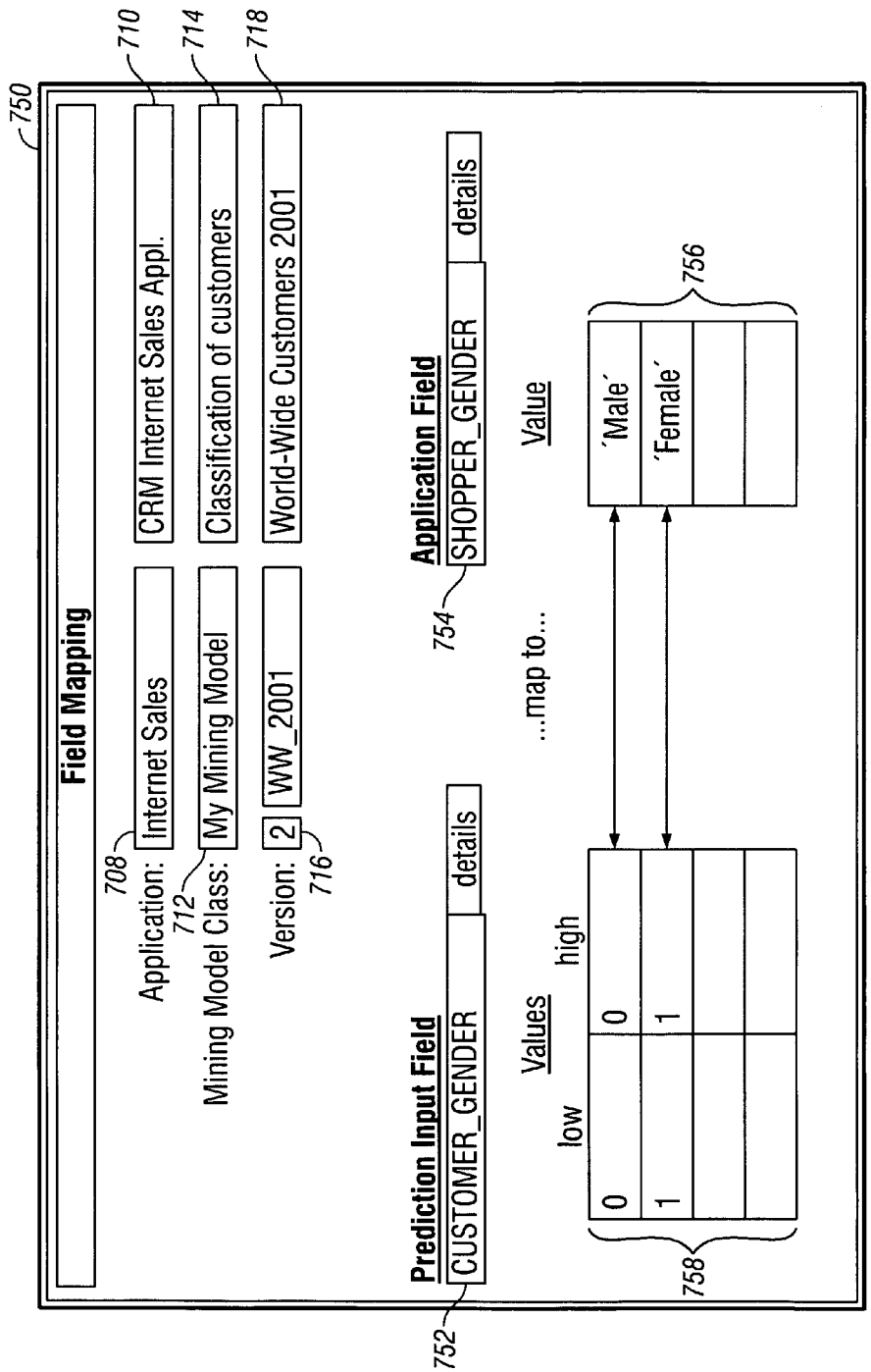
FIG. 7B is a screen display of a field mapping definition according to one implementation.

FIG. 7B is a screen display of a field mapping definition according to one implementation of the invention. FIG. 7B shows how one of the prediction input fields from set 724 (shown in FIG. 7A) is mapped to one of the application fields from set 726. Screen display 750 shows fields 708, 710, 712, 714, 716, and 718 from FIG. 7A. In addition, FIG. 7B shows a specific prediction input field 752, CUSTOMER_GENDER, and a specific application field 754, SHOPPER_GENDER. As described earlier, input fields such as these may often utilize a mapping function. In the example shown in FIG. 7B, values 756 are mapped to values 758. In this example, 'Male' from values 756 is mapped to '0' in values 758. 'Female' from values 756 is mapped to '1' in values 758. This is just one example of a mapping functionality that may be utilized by the prediction task. For example, other integer, real, enumerated, etc., types may be used for the mapping function.

A number of implementations of the invention have been described. Nevertheless, it will be understood that various modifications may be made without departing from the spirit and scope of the invention. Accordingly, other embodiments are within the scope of the following claims.

What is claimed is:

1. A computer system, including a processor, that allows front-end software applications to use multiple versions of a data mining model during execution of analytical tasks, the computer system comprising:

a front-end software application operable to generate transaction data and send task requests to an analytical processing front-end application, a task request for analytical processing including a predefined task name and input data for a data mining model, the front-end software application being one of multiple front-end software applications operable to send task requests for analytical processing to the analytical processing front-end application;

the analytical processing front-end application comprising:

a model version selection module that is operable to use a predefined task name in a task request received from the front-end software application to identify, from predefined task definition information, a specific version of the data mining model to be used during execution of an analytical task, the specific version of the data mining model being included in an analytical back-end application, the analytical back-end application being distinct from the analytical processing front-end application and including multiple versions of the data mining model; and a mapping module that is operable to map, in accordance with predefined mapping definitions included in the predefined task definition information, the input data into a format usable by the specific version of the data mining model, and the analytical processing back-end application operable to invoke execution of the analytical task using the specific version of the data mining model and the mapped input data to generate output data.

2. The computer system of claim 1, wherein the mapping module is operable to map input data included in the task request into a format usable by any version of the data mining model.

3. The computer system of claim 1, wherein the mapping module is further operable to map output data generated upon execution of the analytical task into a format usable by the front-end software application.

4. The computer system of claim 1, wherein the analytical task is a prediction task.

5. A computer-implemented method for providing a software interface to multiple versions of a data mining model during execution of analytical tasks, the method comprising:

obtaining from a front-end software application a first task request for analytical processing, the first task request containing a first set of input values and a predefined task name, the front-end software application being one of multiple front-end software applications operable to send task requests for analytical processing to the software interface;

using the predefined task name to identify, from predefined task definition information, a first version of the data mining model to be used when executing a first analytical task;

using a first input mapping function to map, in accordance with predefined mapping definition information included in the predefined task definition information, the first set of input values into a first set of mapped input values for use by an analytical software application when executing the first analytical task with the first version of the data mining model;

obtaining from the front-end software application a second task request for analytical processing, the second task request containing a second set of input values and the predefined task name, and the second set of input values being a subset of the first set of input values;

using the predefined task name to identify, from predefined task definition information, a second version of the data mining model to be used; and using a second input mapping function to map, in accordance with predefined mapping definition information included in the predefined task definition information, the second set of input values into a second set of mapped input values for use by the analytical software application when executing the second analytical task with the second version of the data mining model.

6. The computer-implemented method of claim 5, wherein each one of the second set of input values has a data type that matches a data type of one of the input values from the first set of input values.

7. The computer-implemented method of claim 5, wherein the method further comprises:

sending a first set of output values generated upon execution of the first analytical task to the front-end software application; and sending a second set of output values generated upon execution of the second analytical task to the front-end software application.

8. The computer-implemented method of claim 7, wherein sending a second set of output values generated upon execution of the second analytical task to the front-end software application includes sending a second set of output values that are a subset of the first set of output values.

9. The computer-implemented method of claim 8, wherein sending a second set of output values that are a subset of the first set of output values includes sending a second set of output values that each individually have a data type that matches a data type of one of the output values from the first set of output values.

10. The computer-implemented method of claim 7, wherein:

sending a first set of output values generated upon execution of the first analytical task to the front-end software application includes using a first output mapping function to map the first set of output values into a first set of mapped output values for use by the front-end software application; and sending a second set of output values generated upon execution of the second analytical task to the front-end software application includes using a second output mapping function to map the second set of output values into a second set of mapped output values for use by the front-end software application.

11. The computer-implemented method of claim 10, wherein the second output mapping function is identical to the first output mapping function.

12. The computer-implemented method of claim 5, wherein the second input mapping function is identical to the first input mapping function.

13. The computer-implemented method of claim 5, wherein the first and second analytical tasks are prediction tasks.

14. The computer system of claim 1 wherein the analytical processing front-end comprises a business rule engine operable to use output data generated by the analytical processing back-end application to determine whether an event should be triggered in the front-end software application.

15. The method of claim 5 further comprising using business rules and output resulting from executing the first analytical task with the first version of the data mining model to determine whether an event should be triggered in the front-end software application.

* * * * *